US011221962B2

(12) United States Patent
Gonion et al.

(10) Patent No.: US 11,221,962 B2
(45) Date of Patent: Jan. 11, 2022

(54) UNIFIED ADDRESS TRANSLATION (71) Applicant: Apple Inc., Cupertino, CA (US)

(72) Inventors: Jeffry E. Gonion, Campbell, CA (US); Bernard Joseph Semeria, Palo Alto, CA (US); Michael J. Swift, Brooklyn, NY (US); Pradeep Kanapathipillai, Santa Clara, CA (US); David J. Williamson, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/874,997

(22) Filed: May 15, 2020

(65) Prior Publication Data
US 2021/0064539 A1 Mar. 4, 2021

Related U.S. Application Data (60) Provisional application No. 62/895,884, filed on Sep. 4, 2019.

(51) Int. Cl.
G06F 12/1009 (2016.01)
G06F 12/14 (2006.01)
(Continued)

(52) U.S. Cl.
CPC ...... G06F 12/1009 (2013.01); G06F 12/0873 (2013.01); G06F 12/1072 (2013.01); G06F 12/1458 (2013.01)

(58) Field of Classification Search
CPC ............. G06F 12/0873; G06F 12/1009; G06F 12/1036; G06F 12/1072; G06F 12/1458
See application file for complete search history.

(56) References Cited

U.S. PATENT DOCUMENTS 7,509,391 B1 * 3/2009 Chauvel .............. G06F 12/1027
711/154
8,140,820 B2 3/2012 Mansell et al.
(Continued)

FOREIGN PATENT DOCUMENTS

TW 201629763 A 8/2016
TW 201826122 A 7/2018
(Continued)

OTHER PUBLICATIONS

International Search Report and Written Opinion in International Application No. PCT/US2020/049179, dated Dec. 17, 2020, 10 pages.
(Continued)

Primary Examiner — Aracelis Ruiz
(74) Attorney, Agent, or Firm — Kowert Hood Munyon Rankin and Goetzel PC; Rory D. Rankin (57) ABSTRACT A system and method for efficiently transferring address mappings and data access permissions corresponding to the address mappings. A computing system includes at least one processor and memory for storing a page table. In response to receiving a memory access operation comprising a first address, the address translation unit is configured to identify a data access permission based on a permission index corresponding to the first address, and access data stored in a memory location of the memory identified by a second address in a manner defined by the retrieved data access permission. The address translation unit is configured to access a table to identify the data access permission, and is configured to determine the permission index and the second address based on the first address. A single permission index may correspond to different permissions for different entities within the system.

17 Claims, 8 Drawing Sheets (51) Int. Cl.
   *G06F 12/0873*  (2016.01)
   *G06F 12/1072*  (2016.01)

(56) References Cited

U.S. PATENT DOCUMENTS

| | | |
|---|---|---|
| 9,213,651 B2 | 12/2015 | Malyugin et al. |
| 9,852,084 B1 * | 12/2017 | Soderquist .......... G06F 12/1483 |
| 2012/0255015 A1 | 10/2012 | Sahita et al. |
| 2013/0262814 A1 | 10/2013 | Asaro et al. |
| 2014/0331019 A1 | 11/2014 | Parker et al. |
| 2019/0196980 A1 * | 6/2019 | Huang .................. G06F 12/145 |

FOREIGN PATENT DOCUMENTS

| | | |
|---|---|---|
| TW | 201933112 A | 8/2019 |
| WO | 2016064403 A1 | 4/2016 |
| WO | 2018125250 A1 | 7/2018 |
| WO | 2019145667 A1 | 8/2019 |

OTHER PUBLICATIONS

Office Action in Taiwanese Patent Application No. 109130216, dated Jul. 20, 2021, 12 pages.

* cited by examiner

Lookup Table
(LUT)
400

| 412 | 414 |
|---|---|
| 2'b00 | No Access |
| 2'b01 | Write Only |
| 2'b10 | Read Only |
| 2'b11 | Read and Write |

FIG. 4

Lookup Table (LUT) 500

| 512 | "First Mode" 514 | "Second Mode" 516 |
|---|---|---|
| 4'b0000 | No Access | No Access |
| 4'b0001 | No Access | Read and Execute |
| 4'b0010 | No Access | Read Only |
| 4'b0011 | No Access | Read and Write |
| 4'b0100 | Read and Execute | No Access |
| 4'b0101 | Read and Execute | Read and Execute |
| 4'b0110 | Read and Execute | Read Only |
| 4'b0111 | Read and Execute | No Access |
| 4'b1000 | Read Only | No Access |
| 4'b1001 | Read Only | Execute Only |
| 4'b1010 | Read Only | Read Only |
| 4'b1011 | Read Only | Read and Write |
| 4'b1100 | Read and Write | No Access |
| 4'b1101 | Read and Write | Read and Execute |
| 4'b1110 | Read and Write | Read Only |
| 4'b1111 | Read and Write | Read and Write |

UNIFIED ADDRESS TRANSLATION

CROSS REFERENCE TO RELATED APPLICATIONS

This application claims priority to Provisional Patent Application Ser. No. 62/895,884, entitled "UNIFIED ADDRESS TRANSLATION", filed Sep. 4, 2019, the entirety of which is incorporated herein by reference.

BACKGROUND

Technical Field

Embodiments described herein relate to the field of computing systems and, more particularly, to efficiently transferring address mappings and pointers to data access permissions corresponding to the address mappings.

Description of the Related Art

Computing systems often include one or more levels of cache hierarchy for the multiple processors in the computing system. Data from recently accessed memory locations are stored within the caches. When the data is requested again, the data may be retrieved from the caches rather than from later levels in the hierarchy of the system memory. Each of the processors utilizes linear (or "virtual") addresses when processing the accessed data. A virtual address space for the data and instructions stored in system memory and used by a software process may be divided into pages of a given size. The virtual pages may be mapped to frames of physical memory. Address mappings of virtual addresses to physical addresses may keep track of where virtual pages are stored in the physical memory. These address mappings are stored in a page table and this page table is stored in memory. One or more translation look-aside buffers (TLBs) in a processor store a subset of the page table.

In some cases, multiple processors share the same page table. When a given processor processes instructions by a software application to modify a subset or all of the address mappings in the page table, the given processor sends a maintenance request as a broadcast message to other processors in the computing system. The maintenance request may include an indication that the receiving processors are to invalidate current address mappings in a subset or all of a corresponding TLB. In various embodiments, the operating system may use a TLB invalidate instruction to invalidate one or more entries in TLB's of the system. For example, in response to the invalidation of a mapping in a translation table in memory, the operating system may issue a TLB invalidate command. In various embodiments, the command may be conveyed via a communication fabric within the system (e.g., communication fabric 130 of FIG. 1). Included with the command may be an address space identifier that can be used as an index into a table that indicates which address space a given process uses to defined its virtual address space. As an example, responsive to detecting the TLB invalidate command on the communication fabric, a processing entity (e.g., GPU) may invalidate one or more entries of a local TLB. In various embodiments the invalidate command may include an indication that all entries in the TLB are to be invalidated, all entries corresponding to a specific address space identifier, a range of virtual addresses, and so on.

After receiving an acknowledgement from the other processors in the computing system, the given processor and one or more other processors retrieve new address mappings from a particular page table before continuing to process subsequent instructions. However, data access permissions may vary for the data pointed to, or otherwise identified, by the address mappings that are shared by multiple processors. Storing the different data access permissions with the address mappings increases the size of the page table entries. Storing multiple copies of a given page table increases the capacity demands of system memory and includes complicated control logic to track any changes between the copies.

In view of the above, efficient methods and mechanisms for efficiently transferring address mappings and data access permissions corresponding to the address mappings are desired.

SUMMARY

Systems and methods for efficiently transferring address mappings and data access permissions corresponding to the address mappings are contemplated. In various embodiments, a computing system includes at least one processor and memory for storing page tables. The processor stores, in a translation lookaside buffer (TLB), address mappings from a page table in memory. Each buffer entry of the TLB in the processor stores one or more virtual-to-physical address mappings. The processor accesses data pointed to, or otherwise identified, by the physical address of the virtual-to-physical address mappings based on the corresponding data access permissions. Examples of the data access permissions are no access permission, read only permission, write only permission, read and write permission, and read and execute permission. In various embodiments, each page table entry in memory stores one or more address mappings and corresponding permission indices. As used herein, the "permission indices" are also referred to as permission pointers, permission identifiers and so on. The permission indices do not store data access permissions, but they are used within a processor to identify the data access permissions.

In various embodiments, the processor additionally includes one or more lookup tables (LUTs). Each table entry stores at least one type of data access permissions. The above examples of the data access permissions are equivalent to the types of data access permissions. Therefore, the read only permission is one type, and the write only permission is another type, and so on. In some embodiments, when the processor receives one or more address mappings and a corresponding permission index from a page table in memory, logic within the processor selects one of the one or more LUTs based on the received permission index. In other embodiments, when the processor performs address translation while executing a memory access operation, the logic within the processor selects one of the one or more LUTs based on the received permission index.

In some embodiments, multiple LUTs are maintained in a same data storage such as a set of registers, a queue, a content addressable memory (CAM), a register file, a random access memory (RAM), and so forth. The logic in the processor uses a portion of the permission index to select a portion of the single data storage used to implement the LUTs. In other embodiments, multiple LUTs are maintained in physically separate data storage. In an embodiment, when a table entry is selected, or otherwise identified, the logic reads a data access permission stored in the selected table entry. In various embodiments, the address mapping and the permission index are shared by one or more external processors. In an embodiment, at least one of the other processors uses a different data access permission despite sharing the same address mapping and the permission index. For example, the processor is a central processing unit (CPU) and an external processor is a graphics processing unit (GPU). The CPU and the GPU share one or more page tables, but the CPU uses data access permissions different from data access permissions used by the GPU. The CPU maintains its set of internal LUTs and the GPU maintains its separate set of internal LUTs. Now, in various embodiments, a single copy of the shared page table is stored in system memory, rather than a first copy for the CPU and a second copy for the GPU. Accordingly, in various embodiments, a single copy of permission indices and unified address translations, or mappings, are stored in a single, shared page table in system memory.

In some embodiments, the processor uses an operating mode in addition to the received permission index to select data access permissions. Examples of the operating mode are a normal operating mode and an alternate operating mode used by the operating system running on the processor. In an embodiment, the logic in the processor selects a given LUT of the multiple LUTs based on the operating mode. In another embodiment, the table entries of a LUT store multiple sets of data access permissions, and the logic selects the set within a selected table entry based on the operating mode.

In other embodiments, the processor uses an exception level in addition to one or more of the operating mode and the received permission index to select data access permissions. The exception level is used to indicate an amount of access to the processor's internal registers. As used herein, the "exception level" is also referred to as the "privilege level." In some cases, the lower the exception level, the less access is granted to the processors internal registers. For example, an exception level of zero (or EL0) is a user level for executing software applications and the exception level of zero does not have access to registers used for exceptions and interruptions, registers within the memory management unit (MMU), and so forth. In some designs, a hypervisor has the same privileges or accesses as a user with host privileges. Therefore, there is a host EL0 and a guest EL0. In other designs, the hypervisor has less privileges or access, and therefore, a guest exception level is always more restrictive than a host exception level.

In various designs, the processor maintains a separate LUT for each operating mode and each exception level. Additionally, in some designs, the processor maintains a separate LUT or set of LUTs for each page table shared by a different external processor. For example, the processor maintains a first set of one or more LUTs for page tables shared by a GPU. The processor also maintains a second set of one or more LUTs for page tables shared by a multimedia engine or a digital signal processor (DSP), an audio processor, or a camera, and so on.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
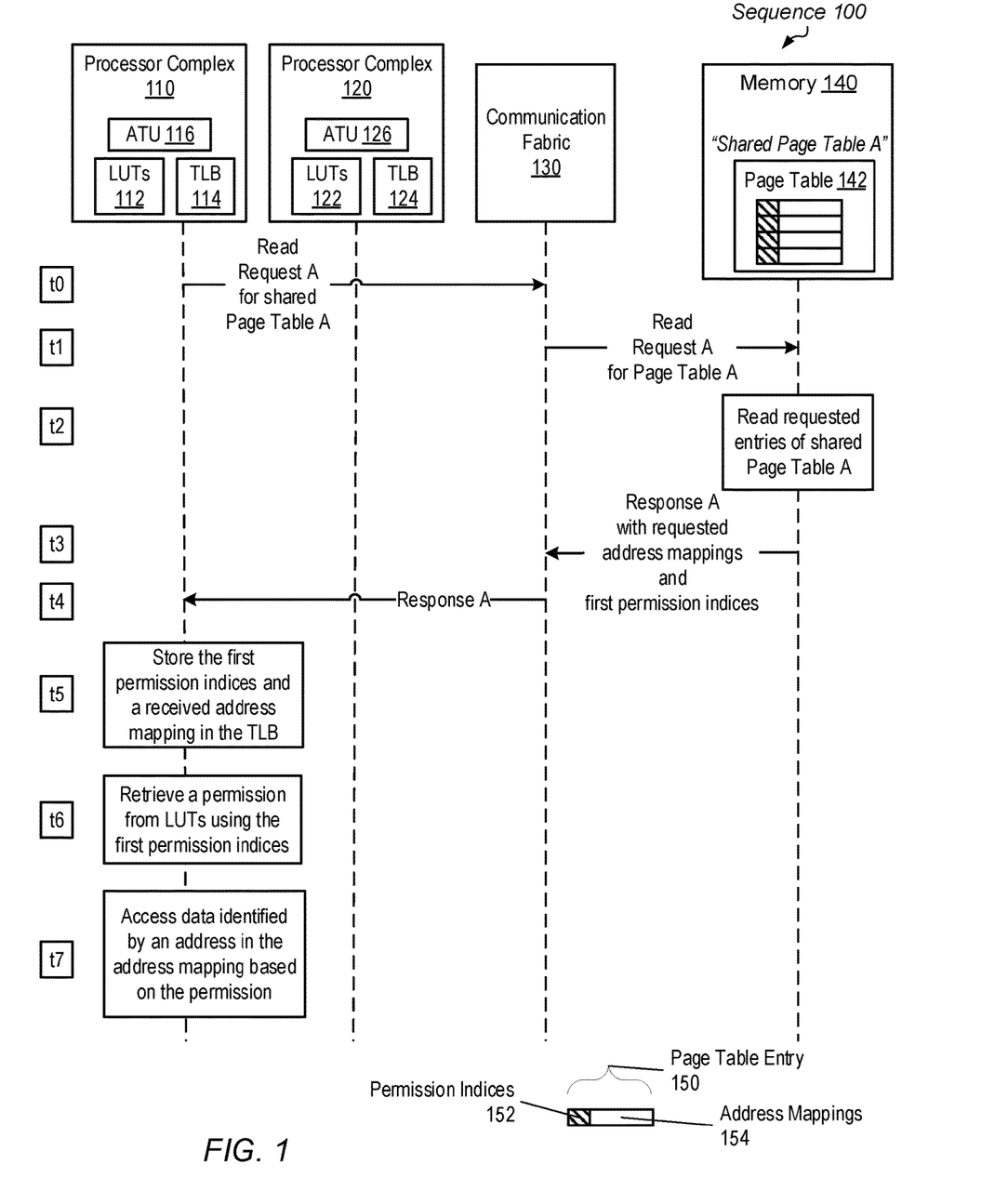
FIG. 1 is a block diagram of one embodiment of a sequence of requests between processors and memory for transferring address mappings and pointers to data access permissions corresponding to the address mappings.

Referring to FIG. 1, a generalized block diagram of one embodiment of a sequence 100 of requests between processors and memory for transferring address mappings and pointers to data access permissions corresponding to the address mappings in a computing system is shown. In the illustrated embodiment, two processor complexes 110 and 120 transfer messages and data to one another and memory 140 through a communication fabric 130. Although only two processor complexes are shown, in other embodiments, another number of processor complexes are in the system. The term "processor complex" is used to denote a configuration of one or more processor cores using local storage, such as a shared cache memory subsystem, and capable of processing a workload together.

In various embodiments, different types of traffic flows independently through communication fabric 130. In some embodiments, communication fabric 130 utilizes a single physical fabric bus to include a number of overlaying virtual channels, or dedicated source and destination buffers, each carrying a different type of traffic. Each channel is independently flow controlled with no dependence between transactions in different channels. In other embodiments, communication fabric 130 is packet-based, and may be hierarchical with bridges, cross bar, point-to-point, or other interconnects. Each of the processor complexes includes a fabric interface unit (FIU). In some designs, an FIU includes queues for storing incoming and outgoing messages in addition to circuitry for transferring messages and data with communication fabric 130 according to a given communication protocol. In an embodiment, the circuitry includes decoder logic for partial pre-decoding or full decoding of received requests.

In various embodiments, each of the multiple processor complexes 110 and 120 utilizes linear addresses (virtual addresses) when retrieving instructions and data while processing one or more software applications. The instructions and data may be retrieved from a local cache memory subsystem, which is not shown for ease of illustration. When the local cache memory subsystem does not store the requested data, the multiple processor complexes 110 and 120 access memory 140, which represents local system memory and/or external memory.

Each of the processor complexes 110 and 120 includes at least one translation look-aside buffer (TLB). For example, processor complex 110 includes TLB 114 and processor complex 120 includes TLB 124. Each of the TLBs 114 and 124 stores a subset of a page table such as page table 142. Although a single page table is shown, in various designs, memory 140 stores multiple page tables. However, in various embodiments, page table 142 is a single copy of permission indices and corresponding address mappings stored in the memory 140. The page table 142 stores address mappings of virtual addresses to physical addresses where virtual pages are loaded in the physical memory. As shown, the page table 142 includes multiple page table entries. The page table entry 150 is representative of any one of the page table entries in the page table 142. The page table entry 150 includes one or more address mappings 154 such as address mappings of virtual addresses to physical addresses. The page table entry 150 also includes one or more permission indices 152 corresponding to the one or more address mappings 154. The permission indices 152 do not store data access permissions, but they are used within the processor complexes 110 and 120 to identify the data access permissions.

The processor complex 120 uses the TLB 124 in a similar manner as the processor complex 110 uses the TLB 114. Therefore, the processor complex 120 also performs the following steps. When the processor complex 110 executes a given memory access operation, the processor complex 110 accesses the TLB 114 with a linear (virtual) address of the given memory access operation to determine whether the TLB 114 contains an associated physical address for a memory location holding requested instructions or requested data. As used herein, a "memory access operation" is also referred to as a "memory access request."

Each buffer entry of the TLBs 114 and 124 stores one or more virtual-to-physical address mappings and data access permissions corresponding to the virtual-to-physical address mappings. The processor complex 110 accesses data pointed to by the physical address of the virtual-to-physical address mappings based on the corresponding data access permissions. Examples of the data access permissions are no access permission, read only permission, write only permission, read and write permission, and read and execute permission. In various embodiments, the processor complex 110 loads data access permissions from the one or more lookup tables (LUTs) 112 into the TLB 114 based on received permission indices. Each table entry of the LUTs 112 stores at least one type of data access permissions. The above examples of the data access permissions are equivalent to the types of data access permissions. Therefore, the read only permission is one type, and the write only permission is another type, and so on.

In various embodiments, the page table 142 is shared by each of the processor complexes 110 and 120. In various embodiments, a single copy of the shared page table 142 is stored in memory 140, rather than a first copy for the processor complex 110 and a second copy for the processor complex 120. Therefore, the single page table 142 includes unified address translations, or mappings, since the same copy of the address translations are accessed by at least the processor complex 110 and the processor complex 120. Although the processor complexes 110 and 120 share the address mappings and the permission indices stored in the page table 142, each of the processor complexes 110 and 120 has separate data access permissions from the other. Therefore, although the LUTs 112 and 122 are indexed by the same permission indices stored in the page table 142, the LUTs 112 and 122 store different data access permissions.

Following, a sequence of steps for selecting data access permissions from multiple available data access permissions is described using the points in time t0 to t7. The point in time t0 is also referred to as simply time to. As the processor complex 110 processes one or more software applications, the unified address translation unit 116 in the processor complex 110 generates and sends the read request "A" at time t0 for content stored in the page table 142. The page table 142 is also indicated as the "Shared Page Table A." The unified address translation unit 116 is also referred to as the address translation unit (ATU) 116. The ATU 116 includes logic that is implemented as hardware, software or a combination of hardware and software. Similarly, the ATU 126 of processor complex 120 is implemented as hardware including circuitry, software or a combination of hardware and software. As shown, at point in time t1 (or time t1), the communication fabric 130 relays the read request "A" to the memory 140. At time t2, the memory controller (not shown) for the memory 140 determines the request "A" is a memory read request and accesses the targeted page table 142.

At time t3, the memory controller for the memory 140 sends the response "A" with the requested one or more address mappings from the page table 142 to the communication fabric 130. The response "A" also includes the first permission indices corresponding to the one or more address mappings. At time t4, the communication fabric 130 sends the response "A" to the processor complex 110. In some embodiments, the FIU of the processor complex 110 performs decoding and determines response "A" is a memory read response. Afterward, the FIU sends the decoded response "A" to one or more cores in the processor complex 110.

In some embodiments, when the ATU 116 of the core receives one or more address mappings and a corresponding permission index from the page table 142, at time t5, the ATU 116 stores the received first permission indices in a buffer entry of the TLB 114. Additionally, the ATU 116 stores the received one or more address mapping in the buffer entry of the TLB 114. In another embodiment, the ATU 116 stores the received first permission indices in another buffer of one or more buffers in the processor complex 110. The one or more buffers are implemented as one of a set of registers, a queue, a table, a content addressable memory (CAM), a register file, a random access memory (RAM), and so forth. In an embodiment, the one or more buffers include at least the LUTs 112 and the TLB 114. In some embodiments, the ATU 116 selects one of the tables of LUTs 112 based on one or more of an operating mode of the processor complex 110, an exception level of the processor complex 110 and a permission index of the one or more received first permission indices. The ATU 116 uses a remainder of the permission index, such as a table index, to select a table entry of the selected table. Following, the ATU 116 reads a data access permission from the selected table entry. In such embodiments, the ATU 116 stores the retrieved data access permission in a buffer entry of the TLB 114. Additionally, the ATU 116 stores the corresponding address mapping in the buffer entry. In another embodiment, the ATU 116 stores the address mapping in the buffer entry of the TLB 114, but stores the data access permission in another buffer of the one or more buffers in the processor complex 110.

At time t6, the ATU 116 processes a received memory access operation with a first address. In some embodiments, the ATU 116 retrieves a permission index based on the first address from one of the one or more buffers in the processor complex 110. In an embodiment, the ATU 116 retrieves the permission index based on the first address from a buffer entry of the TLB 114. In another embodiment, the ATU 116 retrieves the permission index based on the first address from an entry of another buffer of the one or more buffers in the processor complex 110. Additionally, the ATU 116 retrieves a second address based on an address mapping with the first address from a buffer entry of the TLB 114. Afterward, the ATU 116 retrieves a data access permission from one of the tables of LUTs 112 with access steps described earlier for the point in time t5. At time t7, the one or more cores of the processor complex 110 access data stored in a memory location identified by the retrieved second address based on the data access permission. It is noted that in some embodiments, at the earlier point in time t5 when one or more cores of the processor complex 110 receive address mappings and a corresponding permission index from the page table 142, the one or more cores select one of the tables of LUTs 112 based on one or more of an operating mode of the processor complex 110, an exception level of the processor complex 110, and the corresponding permission index. The one or more cores retrieve a data access permission from a table entry of the selected LUTs 112 and access data stored in a memory location identified by an address corresponding to the permission index based on the retrieved data access permission.

Figure 2:
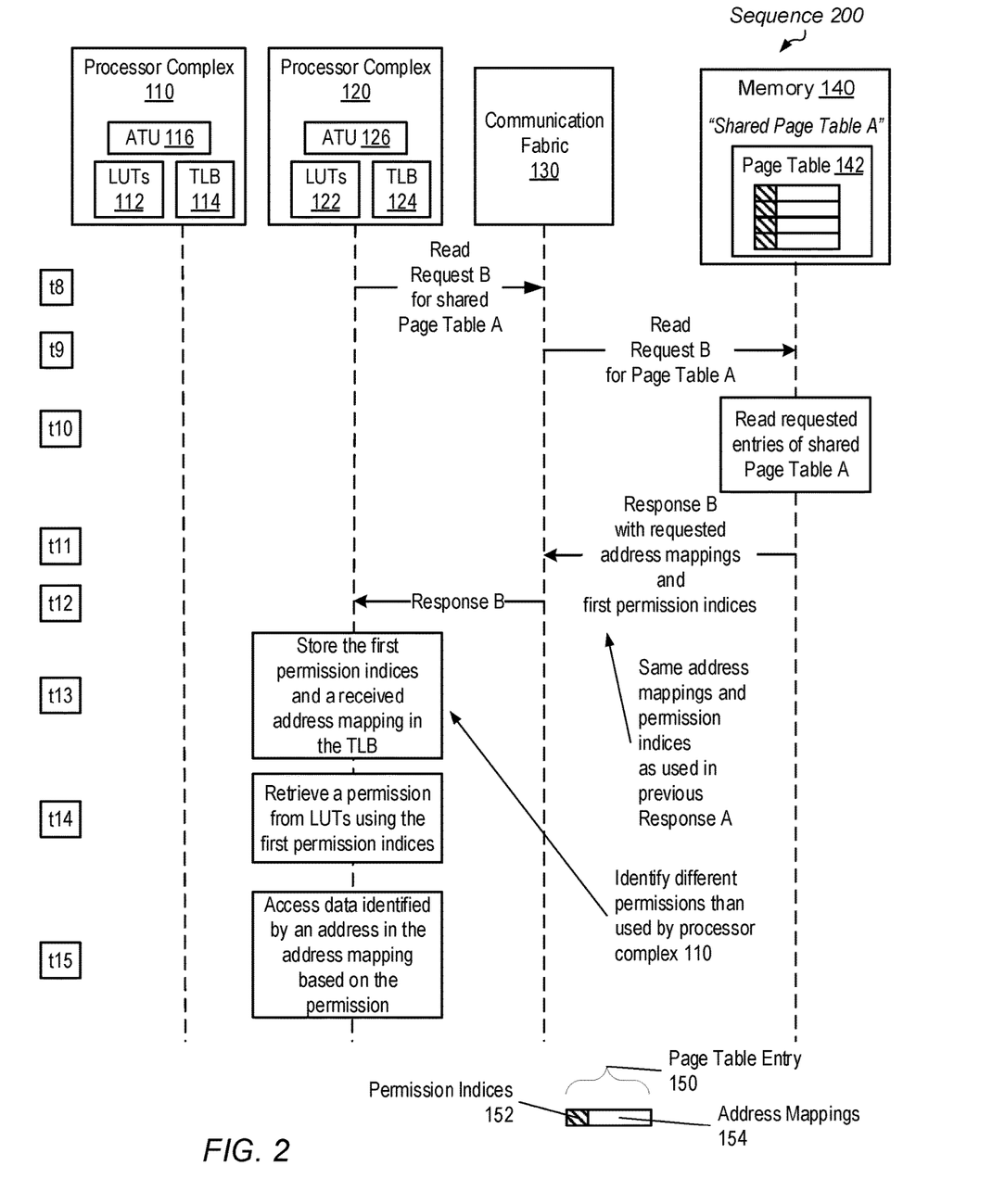
FIG. 2 is a block diagram of one embodiment of a sequence of requests between processors and memory for transferring address mappings and pointers to data access permissions corresponding to the address mappings.

Referring to FIG. 2, a generalized block diagram of one embodiment of a sequence 200 of requests between processors and memory for transferring address mappings and pointers to data access permissions corresponding to the address mappings in a computing system is shown. Circuitry and logic previously described are numbered identically. As described earlier, each of the processor complexes 110 and 120 share access to the page table 142. A sequence of steps for selecting data access permissions from multiple available data access permissions in the processor complex 110 has been previously described in FIG. 1. Here, a sequence of steps for selecting data access permissions from multiple available data access permissions in the processor complex 120 is described using the points in time t8 to t15.

As the processor complex 120 processes one or more software applications, the ATU 126 of the processor complex 120 generates and sends the read request "B" at time t8 for content stored in the page table 142, which is also indicated as the "Shared Page Table A." As shown, at time t9, the communication fabric 130 relays the read request "B" to the memory 140. At time t10, the memory controller for the memory 140 determines the request "B" is a memory read request and accesses the targeted page table 142.

At time t11, the memory controller for the memory 140 sends the response "B" with the requested one or more address mappings from the page table 142 to the communication fabric 130. The response "B" also includes the first permission indices corresponding to the one or more address mappings. It is noted that these are the same first permission indices returned to the processor complex 110. At time t12, the communication fabric 130 sends the response "B" to the processor complex 120. The FIU of the processor complex 120 performs decoding and determines response "B" is a memory read response. Afterward, the FIU sends the decoded response "B" to a given core in the processor complex 120.

When the core receives one or more address mappings and a corresponding permission index from the page table 142, at time t13, the ATU 126 performs steps described earlier for ATU 116 at point in time t5. Similarly, at time t14, the ATU 126 performs steps described earlier for ATU 116 at point in time t6. However, it is noted that despite using the same permission index as the processor complex 110, the processor complex 120 retrieves different data access permissions. At time t15, the one or more cores of the processor complex 120 accesses data identified by an address in the address mapping based on a corresponding retrieved data access permission.

Figure 3:
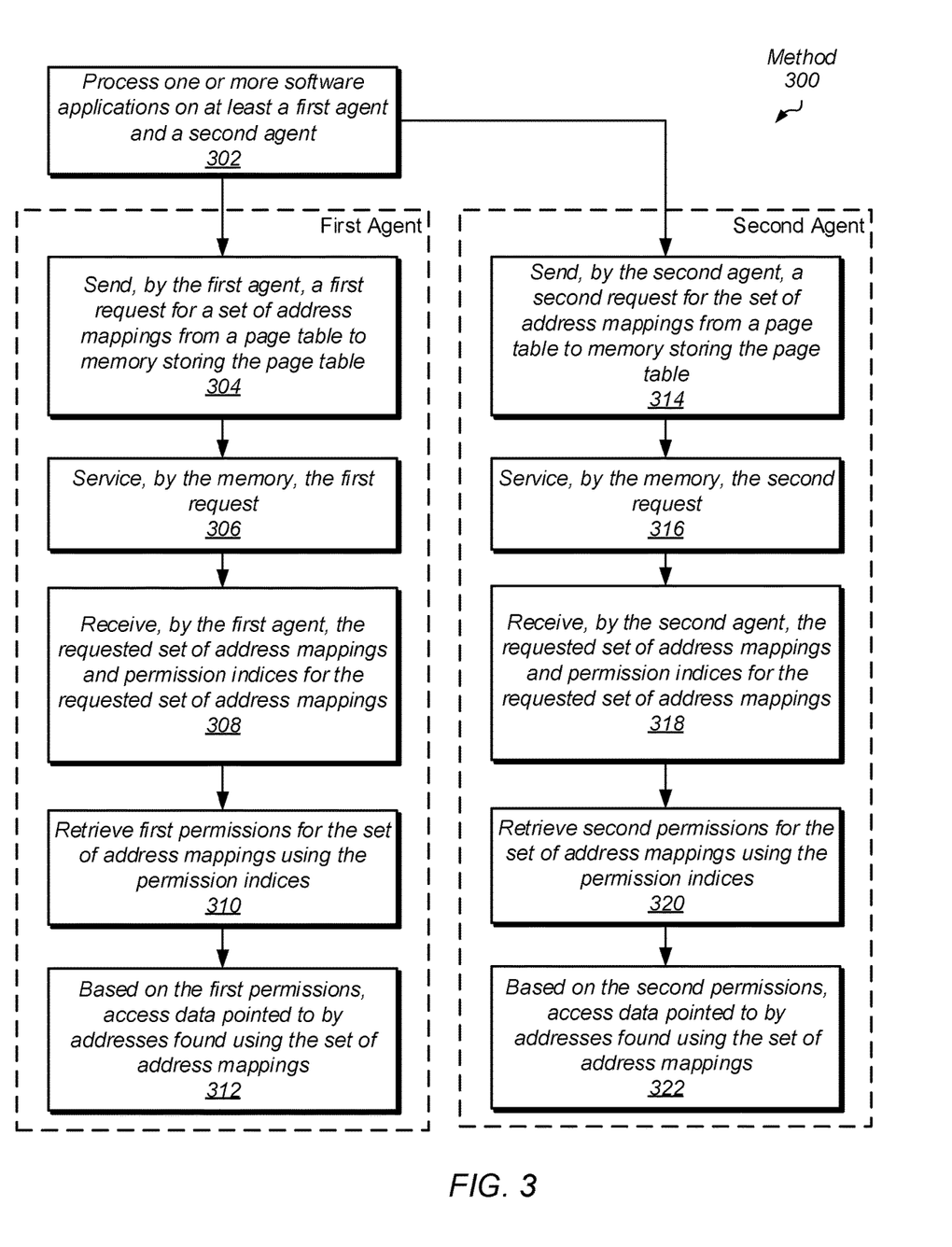
FIG. 3 is a flow diagram of one embodiment of a method for efficiently transferring address mappings and corresponding pointers to data access permissions.

Turning now to FIG. 3, a generalized flow diagram of one embodiment of a method 300 for efficiently transferring address mappings and corresponding pointers to data access permissions is shown. For purposes of discussion, the steps in this embodiment are shown in sequential order. However, in other embodiments some steps may occur in a different order than shown, some steps may be performed concurrently, some steps may be combined with other steps, and some steps may be absent.

In various designs, a computing system includes a communication fabric for routing traffic among one or more agents and one or more endpoints. Each agent and each endpoint is both a source and a destination for transactions depending on the direction of traffic flow through the fabric. Examples of agents include one or more of multimedia engines, digital signal processors (DSPs), and processing units or processor complexes (as described earlier), each with one or more of a central processing unit (CPU) and a data parallel processor like a graphics processing unit (GPU). Endpoints include input/output (I/O) peripheral devices such as memory devices, communication interfaces such as radio communication interfaces, speakers, a camera, displays and so on. Data is shared among the different agents and among the available endpoints. Although the following description refers to agents, one or more of the agents may be replaced with an example of an endpoint.

At least a first agent and a second agent process one or more software applications (block 302). The first agent sends a first request for a set of address mappings from a page table to memory storing the page table (block 304). The fabric relays the first request to the memory where the corresponding memory controller stores the first request. The memory controller of the memory services the first request (block 306). The first agent receives via the fabric the requested set of address mappings and permission indices for the requested set of address mappings (block 308).

In some embodiments, the first agent retrieves first data access permissions (or first permissions) for the set of address mappings using the permission indices (block 310). In one embodiment, the first agent retrieves the first permissions when the first agent receives the permission indices. As described earlier, in some embodiments, the first agent selects one of the multiple lookup tables (LUTs) storing data access permissions based on one or more of an operating mode of the first agent, an exception level of the first agent and a permission index of the one or more received permission indices. The first agent uses a portion of the permission index to select a table entry of the selected table. The first agent reads the first permissions from the selected table entry.

In another embodiment, the first agent retrieves the first permissions while performing an address translation for a memory access operation received at a later point in time. In such embodiments, the first agent stores the set of address mappings, such as storing them in a TLB, and stores the received permission indices in one of multiple buffers in the first agent. The first agent accesses the stored address mappings and the stored permission indices at a later point in time when performing an address translation for a memory access operation. Based on the first permissions, the first agent accesses data pointed to by addresses found using the first set of address mappings (block 312).

In a similar manner as above, the second agent accesses shared data in the page table. However, the second agent uses different data access permissions despite using the same, shared address mappings and corresponding permission indices. For example, the second agent sends a second request for the set of address mappings from the page table to memory storing the page table (block 314). The fabric relays the second request to the memory where the corresponding memory controller stores the second request. The memory controller of the memory services the second request (block 316). The second agent receives via the fabric the requested set of address mappings and permission indices for the requested set of address mappings (block 318). It is noted that these are the same address mappings and the same permission indices received by the first agent in the earlier block 308.

The second agent retrieves the second data access permissions (or second permissions) for the set of address mappings using the permission indices (block 320). In one embodiment, the second agent retrieves the second permissions when the second agent receives the permission indices. It is noted that the second permissions are different from the first permissions. In one example, the first agent has read and write data access permission, but the second agent has read only data access permission. As described earlier, in some embodiments, the second agent selects one of the multiple lookup tables (LUTs) storing data access permissions based on one or more of an operating mode of the second agent, an exception level of the second agent and a permission index of the one or more received given permission indices. The second agent uses the remainder of the permission index to select a table entry of the selected table. The second agent reads the second permissions from the selected table entry.

In another embodiment, the second agent retrieves the second permissions while performing an address translation for a memory access operation received at a later point in time. In such embodiments, the second agent stores the set of address mappings, such as storing them in a TLB, and stores the received permission indices in one of multiple buffers in the second agent. The second agent accesses the stored address mappings and the stored permission indices at a later point in time when performing an address translation for a memory access operation. Based on the second permissions, the second agent accesses data pointed to by addresses found using the set of address mappings (block 322). Again, in one example, the second agent accesses this data with read only data access permission whereas, the first agent accesses this same data with read and write data access permission.

Figure 4:
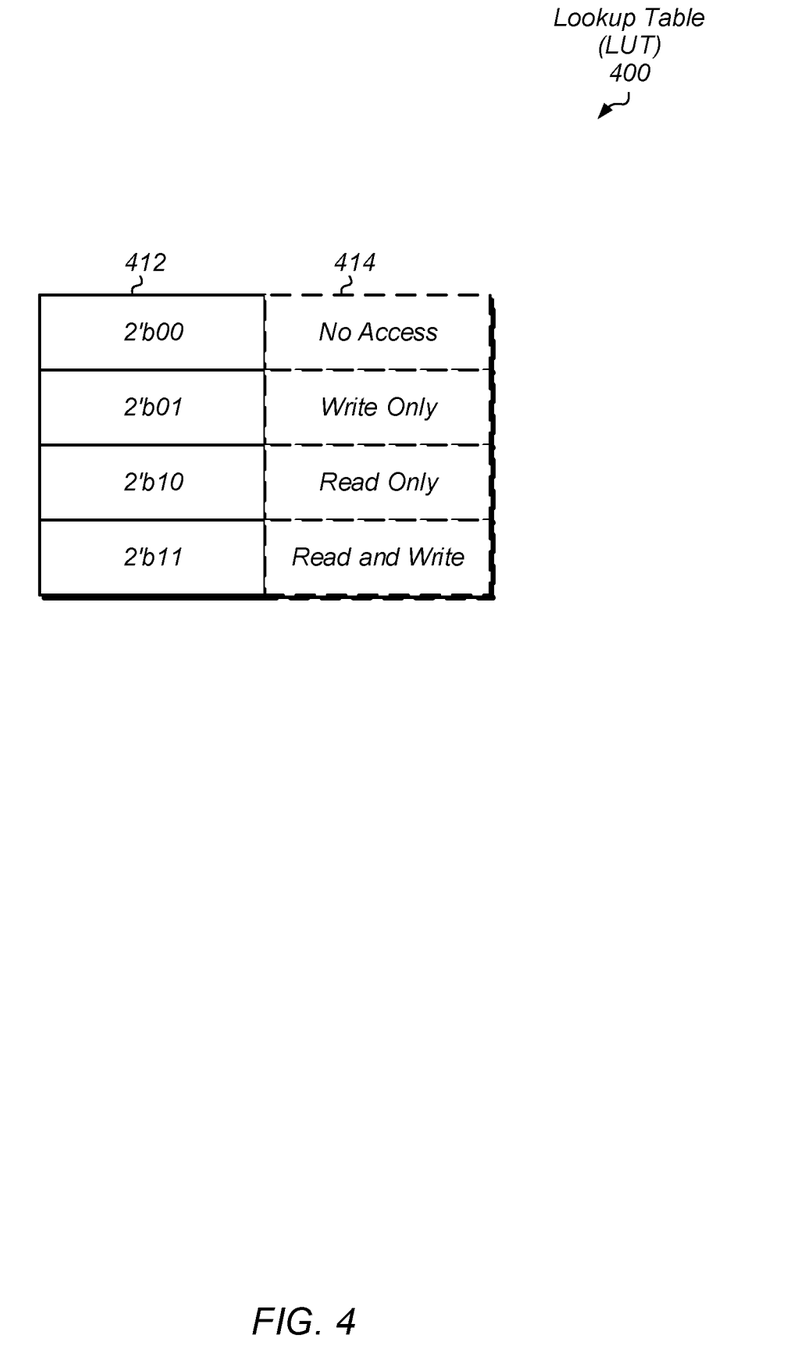
FIG. 4 is a block diagram of one embodiment of a lookup table storing data access permissions.

Referring to FIG. 4, a generalized block diagram of one embodiment of a lookup table (LUT) 400 storing data access permissions is shown. In the illustrated embodiment, LUT 400 includes fields 412-414 which serve to indicate the meaning of the corresponding bits. In some embodiments, logic in an agent selects LUT 400 based on one or more of the operating mode of the agent and the exception level of the agent. Field 412 stores an index for each table entry. The notation "2'b" refers to a binary value with two binary digits, or two bits. As shown, LUT 400 includes four table entries, each with a respective index. In some embodiments, logic in a processor core compares a portion of received permission indices to the values stored in field 412. The logic uses the matched value to select a table entry of LUT 400. Field 414 depicts the meaning of the corresponding bits. For example, the first table entry with the index 2'b00 has the no access permission. The second table entry with the index 2'b01 has the write only permission, and so on. Other values and combinations of values of data access permissions not shown in LUT 400 are also possible and contemplated.

Figure 5:
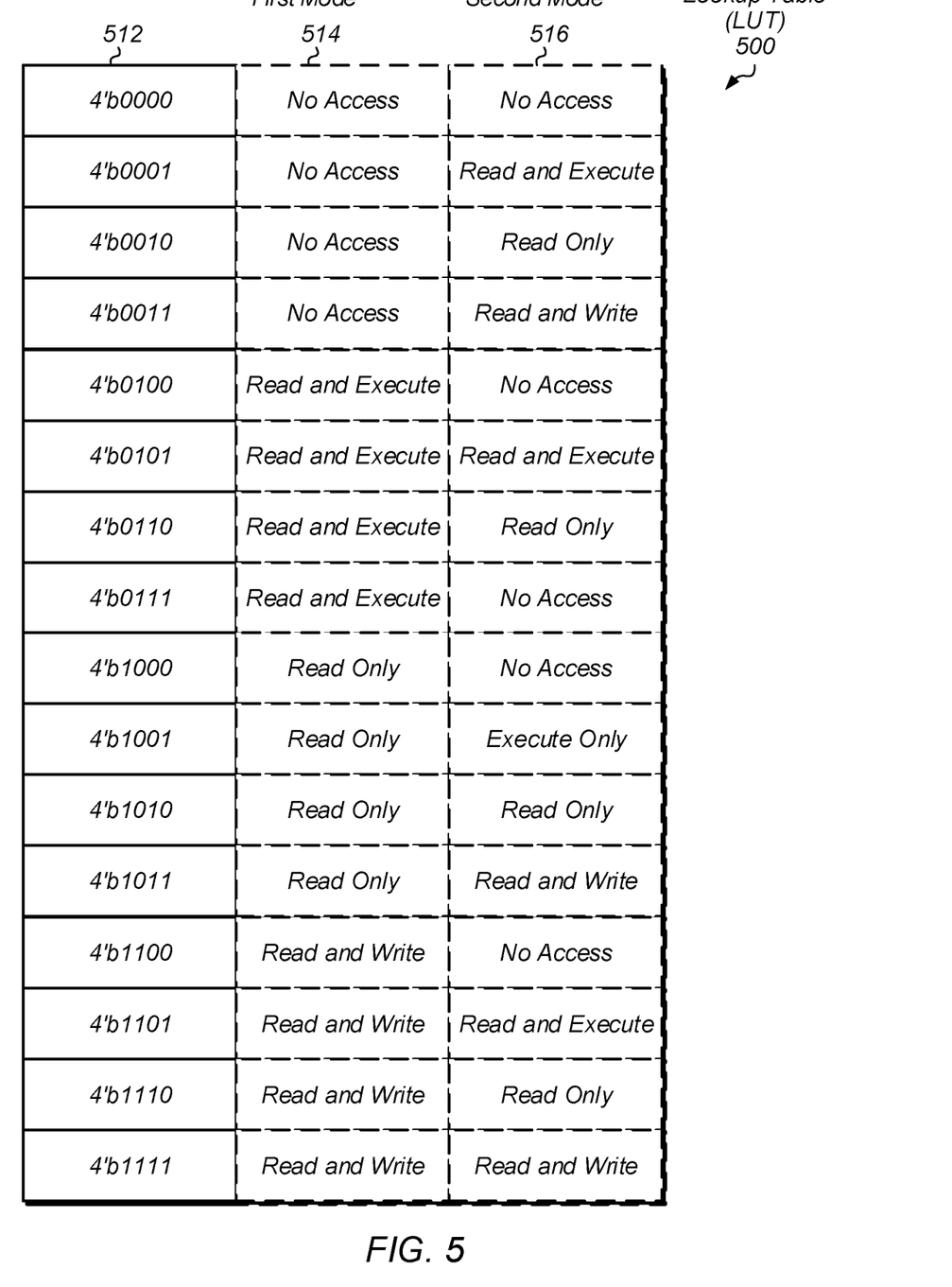
FIG. 5 is a block diagram of one embodiment of a lookup table storing data access permissions.

Referring to FIG. 5, a generalized block diagram of one embodiment of a lookup table (LUT) 500 storing data access permissions is shown. In the illustrated embodiment, LUT 500 includes fields 512-516. In other embodiments, LUT 500 includes more or less fields than shown. In some embodiments, logic in an agent selects LUT 500 based on an exception level of the agent. Field 512 stores an index for each table entry. The notation "4'b" refers to a binary value with 4 binary digits, or four bits. As shown, LUT 500 includes sixteen table entries, each with a respective index. In some embodiments, logic in a processor core compares a portion of received permission indices to the values stored in field 512. The logic uses the matched value to select a table entry of LUT 500.

Fields 514 and 516 indicate the meaning of the corresponding bits for a given mode of operation (First Mode 514 and Second Mode 516). For example, the first table entry with the index 4'b0000 corresponds to the no access permission in both modes of operation. In an embodiment, logic in the agent selects a meaning 514 and 516 based on an operating mode of the agent. In another embodiment, a separate LUT is used for each of the operating modes, and the logic selects one of the two separate LUTs based on whether the agent currently uses the normal operating mode or the alternate operating mode. In some embodiments, an indication of the operating mode is stored in a programmable configuration and status register (CSR). In various designs, the operating system updates this particular CSR. The second table entry of LUT 500 with the index 4'b0001 has the no access permission for the alternate mode in field 514, and the read and execute permission for the normal mode in field 516. Other values and combinations of values of data access permissions not shown in LUT 500 are also possible and contemplated.

Figure 6:
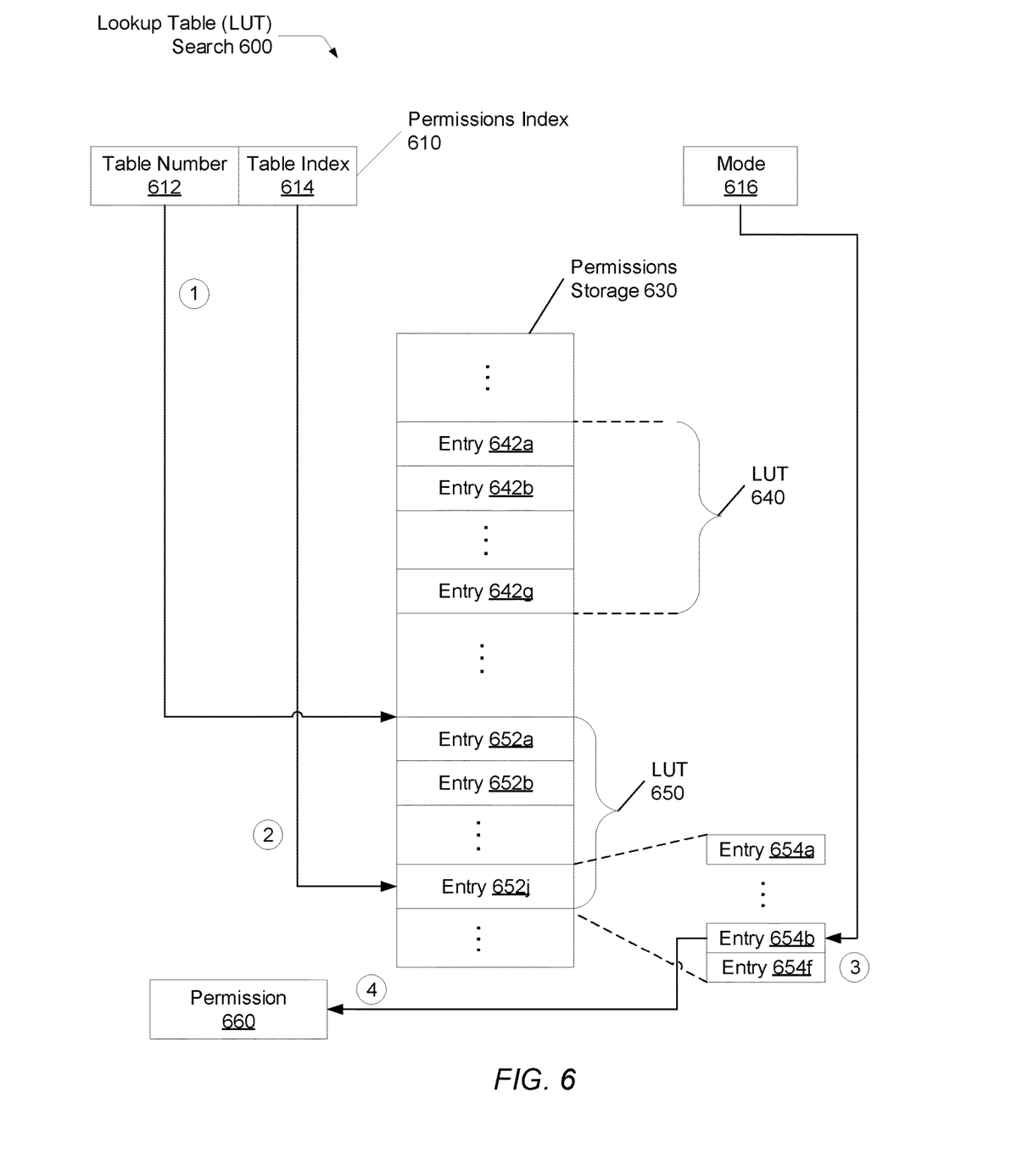
FIG. 6 is a block diagram of one embodiment of a sequence of events for searching a lookup table to retrieve data access permissions.

Turning now to FIG. 6, a generalized block diagram illustrating one embodiment of a lookup table (LUT) search 600 is shown. In various embodiments, the permissions storage 630 is located within an agent, or processor complex. In some embodiments, multiple LUTs are maintained in a same data storage such as permissions storage 630. Permission storage 630 is implemented as one of a set of registers, a queue, a table, a content addressable memory (CAM), a register file, a random access memory (RAM), and so forth. In other embodiments, multiple LUTs are maintained in physically separate data storage.

In an embodiment, logic in the processor of an agent or processor complex uses a portion of the permission index 610 from a page table entry to select a portion of the permissions storage 630 used to implement multiple LUTs. As shown, the permissions index 610 includes a table number 612 and a table index 614. The circled numbers in FIG. 6 depicts an ordered sequence of events. This sequence is used in the following example. Logic in the processor uses the table number 612 to index into the permission storage 630 and select LUT 650. For example, in one embodiment a table number of zero (0) selects the table of FIG. 5 and a table number of one (1) selects the table of FIG. 4. Various such embodiments are possible and contemplated. This portion of permission storage memory 630 pointed to by the table number 612 is generally referred to one LUT, such as LUT 650, of multiple LUTs stored in permission storage 630. The LUT 650 includes table entries 652a-652j. In a similar manner, the LUT 640 includes table entries 642a-642g.

In sequence 2, logic in the processor may index in a forward or a backward direction into the LUT 650 using the table index 614. As shown, the logic selects table entry 652j. In an embodiment, each of the entries 652a-652j may include further entries or fields. For example, entry 652j includes entries 654a-654f. In one embodiment, each of the entries 652a-652j stores a separate data access permission. In some embodiments, the logic in the processor selects entry 654b in sequence 3 based on the mode 616. In several designs, the mode 616 is an operating mode of the agent, or processor complex. In other designs, the mode 616 is an exception level of the agent, or processor complex. In yet other designs, the mode 616 is another value used to distinguish between different types of data access permissions stored in table entry 652j.

In sequence 4, the logic in the processor reads the data access permission 660 from entry 654b. The logic later writes the permission 660 into a selected buffer entry of a TLB. The logic also writes an address mapping into the selected buffer entry. Similar to the permissions index 610, the address mapping was read out earlier from a page table entry stored in system memory.

Figure 7:
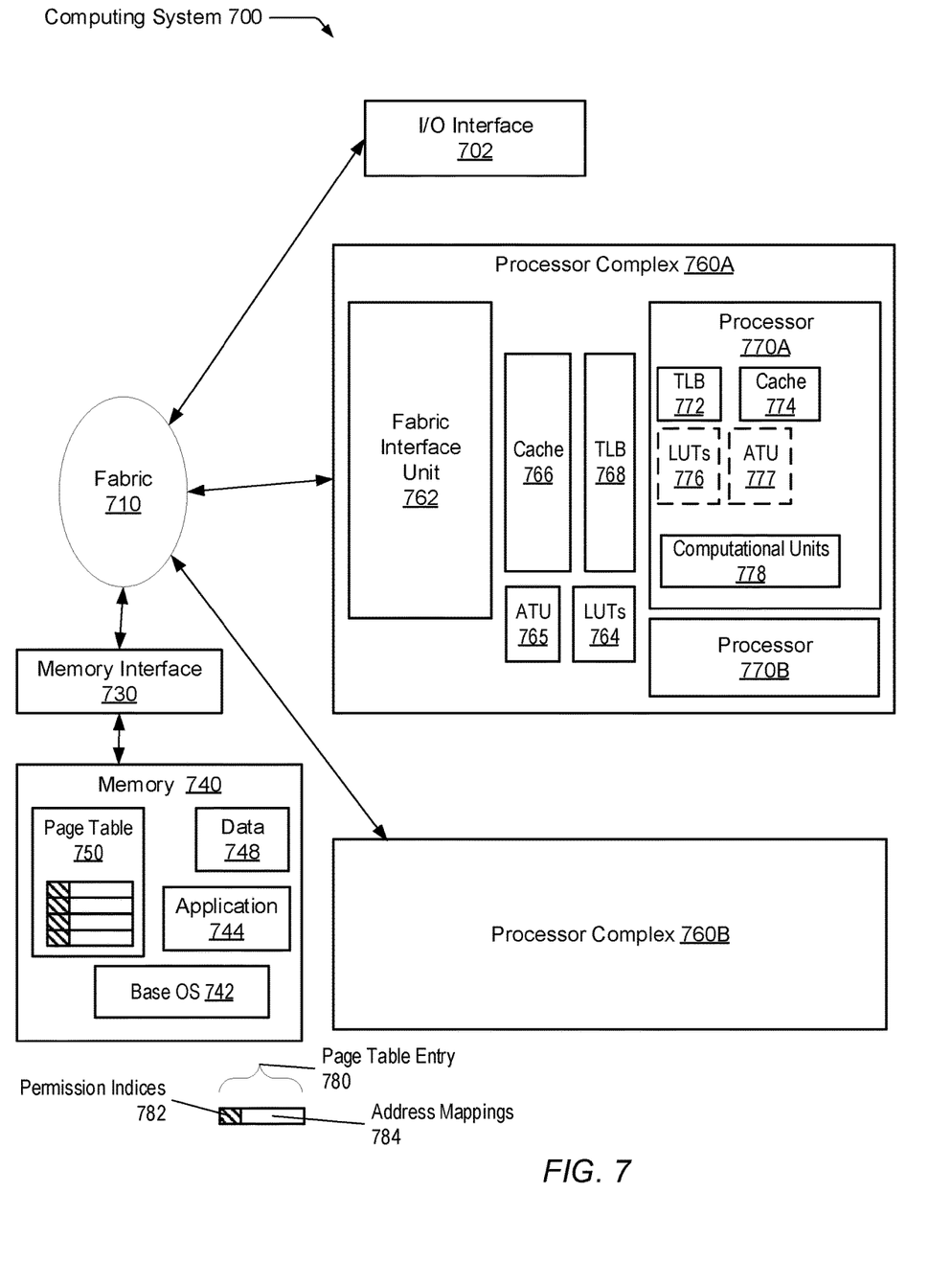
FIG. 7 is a block diagram of one embodiment of a computing system.

Turning now to FIG. 7, a generalized block diagram of one embodiment of a computing system 700 capable of efficiently transferring address mappings and data access permissions corresponding to the address mappings in a computing system is shown. As shown, a communication fabric 710 routes traffic between the input/output (I/O) interface 702, the memory interface 730, and the processor complexes 760A-760B. Clock sources, such as phase lock loops (PLLs), interrupt controllers, power managers, and so forth are not shown in FIG. 7 for ease of illustration. In various embodiments, the computing system 700 is a system on chip (SoC) that includes multiple types of integrated circuits on a single semiconductor die, each integrated circuit providing a separate functionality. In other embodiments, the multiple functional units are individual dies within a package, such as a multi-chip module (MCM). In yet other embodiments, the multiple functional units are individual dies or chips on a printed circuit board.

It is noted that the number of components of the computing system 700 (and the number of subcomponents for those shown in FIG. 7, such as within each of the processor complexes 760A-760B) may vary from embodiment to embodiment. There may be more or fewer of each component/subcomponent than the number shown for the computing system 700. As described earlier, the term "processor complex" is used to denote a configuration of one or more processor cores using local storage, such as a shared cache memory subsystem, and capable of processing a workload together.

In various embodiments, each of the processor complexes 760A-760B operates with a different supply voltage from different power planes. In other embodiments, each of the processor complexes 760A-760B operates with a same supply voltage from a single power plane while also operating with different clock frequencies source from different clock domains. In various embodiments, different types of traffic flows independently through the fabric 710. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. The fabric 710 may also be packet-based, and may be hierarchical with bridges, cross bar, point-to-point, or other interconnects.

In some embodiments, the memory interface 730 uses at least one memory controller and at least one cache for the off-chip memory, such as synchronous DRAM (SDRAM). The memory interface 730 stores memory requests in request queues, uses any number of memory ports, and uses circuitry capable of interfacing to memory using one or more of a variety of protocols used to interface with memory channels used to interface to memory devices (not shown). The memory interface 730 may be responsible for the timing of the signals, for proper clocking to synchronous dynamic random access memory (SDRAM), on-die flash memory, etc.

In various embodiments, one or more of the memory interface 730, an interrupt controller (not shown), and the fabric 710 uses control logic to ensure coherence among the different processor complexes 760A-760B and peripheral devices. In some embodiments, this circuitry uses cache coherency logic employing a cache coherency protocol to ensure data accessed by each source is kept up to date. An example of a cache coherency protocol includes the MOESI protocol with the Modified (M), Owned (O), Exclusive (E), Shared (S), and Invalid (I) states.

Although a single memory 740 is shown, computing system 700 may include multiple memory components arranged in a memory hierarchy. For example, memory 740 may include one or more of a shared last-level cache if it is not included in the memory interface 730, an SDRAM or other type of RAM, on-die flash memory, and so forth. As shown, memory 740 stores one or more applications such as application 744. In an example, a copy of at least a portion of application 744 is loaded into an instruction cache in one of the processors 770A-770B when application 744 is selected by the base operating system (OS) 742 for execution. Alternatively, a virtual (guest) OS (not shown) selects application 744 for execution.

Memory 740 stores a copy of the base OS 742 and copies of portions of base OS 742 are executed by one or more of the processors 770A-770B. Data 748 may represent source data for applications in addition to result data and intermediate data generated during the execution of applications. A virtual address space for the data stored in memory 740 and used by a software process is typically divided into pages of a prefixed size. The virtual pages are mapped to frames of physical memory. The mappings of virtual addresses to physical addresses where virtual pages are loaded in the physical memory are stored in page table 750. Each of translation look-aside buffers (TLBs) 768 and 772 stores a subset of page table 750. As shown, the page table 750 includes multiple page table entries. The page table entry 780 is representative of any one of the page table entries in the page table 750. The page table entry 780 includes one or more address mappings 784 such as address mappings of virtual addresses to physical addresses. The page table entry 780 also includes one or more permission indices 782 corresponding to the one or more address mappings 784. The permission indices 782 do not store data access permissions, but they are used within the processor complexes 760A-760B to identify the data access permissions.

In some embodiments, the components 762-778 of the processor complex 760A are similar to the components in the processor complex 760B. In other embodiments, the components in the processor complex 760B are designed for lower power consumption, and therefore, include control logic and processing capability producing less performance. For example, supported clock frequencies may be less than supported clock frequencies in the processor complex 760A. In addition, one or more of the processors in processor complex 760B may include a smaller number of execution pipelines and/or functional blocks for processing relatively high power consuming instructions than what is supported by the processors 770A-770B in the processor complex 760A.

As shown, processor complex 760A uses a fabric interface unit (FIU) 762 for providing memory access requests and responses to at least the processors 770A-770B. Processor complex 760A also supports a cache memory subsystem which includes at least cache 766. In some embodiments, the cache 766 is a shared off-die level two (L2) cache for the processors 770A-770B although an L3 cache is also possible and contemplated.

In some embodiments, the processors 770A-770B use a homogeneous architecture. For example, each of the processors 770A-770B is a general-purpose processor, such as a central processing unit (CPU), which utilizes circuitry for executing instructions according to a predefined general-purpose instruction set. Any of a variety of instruction set architectures (ISAs) may be selected. In some embodiments, each core within processors 770A-770B supports the out-of-order execution of one or more threads of a software process and include a multi-stage pipeline. In other embodiments, one or more cores within processors 770A-770B supports the in-order execution of one or more threads. The processors 770A-770B may support the execution of a variety of operating systems.

In other embodiments, the processors 770A-770B use a heterogeneous architecture. In such embodiments, one or more of the processors 770A-770B is a highly parallel data architected processor, rather than a CPU. In some embodiments, these other processors of the processors 770A-770B use single instruction multiple data (SIMD) cores. Examples of SIMD cores are graphics processing units (GPUs), digital signal processing (DSP) cores, or otherwise.

In various embodiments, each one of the processors 770A-770B uses one or more cores and one or more levels of a cache memory subsystem. The processors 770A-770B use multiple one or more on-die levels (L1, L2, L7 and so forth) of caches for accessing data and instructions. If a requested block is not found in the on-die caches or in the off-die cache 766, then a read request for the missing block is generated and transmitted to the memory interface 730 via fabric 710. When the application 744 is selected for execution by processor complex 760A, a copy of the selected application is retrieved from memory 740 and stored in cache 766 of processor complex 760A. In various embodiments, each of processor complexes 760A-760B utilizes linear addresses (virtual addresses) when retrieving instructions and data from caches 774 and 766 while processing applications 744-746.

Each of the processors 770A-770B is capable of retrieving permission indices 782 in addition to the corresponding address mappings 784 from the shared page table 750. Each of the processors 770A-770B updates a subset or all of the virtual-to-physical mappings in one or more of TLBs 768 and 772. In addition, in some embodiments, logic located externally from the processors 770A-770B, such as a memory controller (not shown) or the FIU 762, stores the retrieved permission indices 782 in addition to the corresponding address mappings 784 in one or more buffers such as the TLB 768. The logic later selects data access permissions from the LUTs 764 based on a copy of the stored permission indices. In one embodiment, the logic is centralized in the address translation unit (ATU) 765. In an embodiment, the ATU 765 has functionality equivalent to the functionality of the ATU 116 and the ATU 126 (of FIG. 1 and FIG. 2). In one embodiment, the ATU 765 retrieves data access permissions from the LUTs 764 based on the permission indices 782 retrieved from the memory 740. Afterward, the ATU 765 stores the retrieved data access permissions and the corresponding address mappings 784 in one or more buffers such as the TLB 768. In some embodiments, the processor complex 760A includes LUTs 776 and ATU 777 with equivalent functionality as LUTs 764 and ATU 765. In such embodiments, the LUTs 776 stores a subset of the information stored in the LUTs 764.

In some embodiments, the selected data access permissions are used for a subset of the virtual-to-physical mappings in one or more of TLBs 768 and 772. In other embodiments, the selected data access permissions are used for all of the virtual-to-physical mappings in one or more of TLBs 768 and 772. As described earlier, in an embodiment, the ATU 765 accesses the lookup tables (LUTs) 764 with the received permission indices 782 to obtain data access permissions from the LUTs 764. In some embodiments, the data access permissions are stored with the address mappings in each of the TLBs 768 and 772. Although not shown, in some embodiments, one or more other agents, such as an I/O device coupled to the I/O interface 702 also includes LUTs and selects data access permissions based on the permission indices stored in the shared page table 750.

Figure 8:
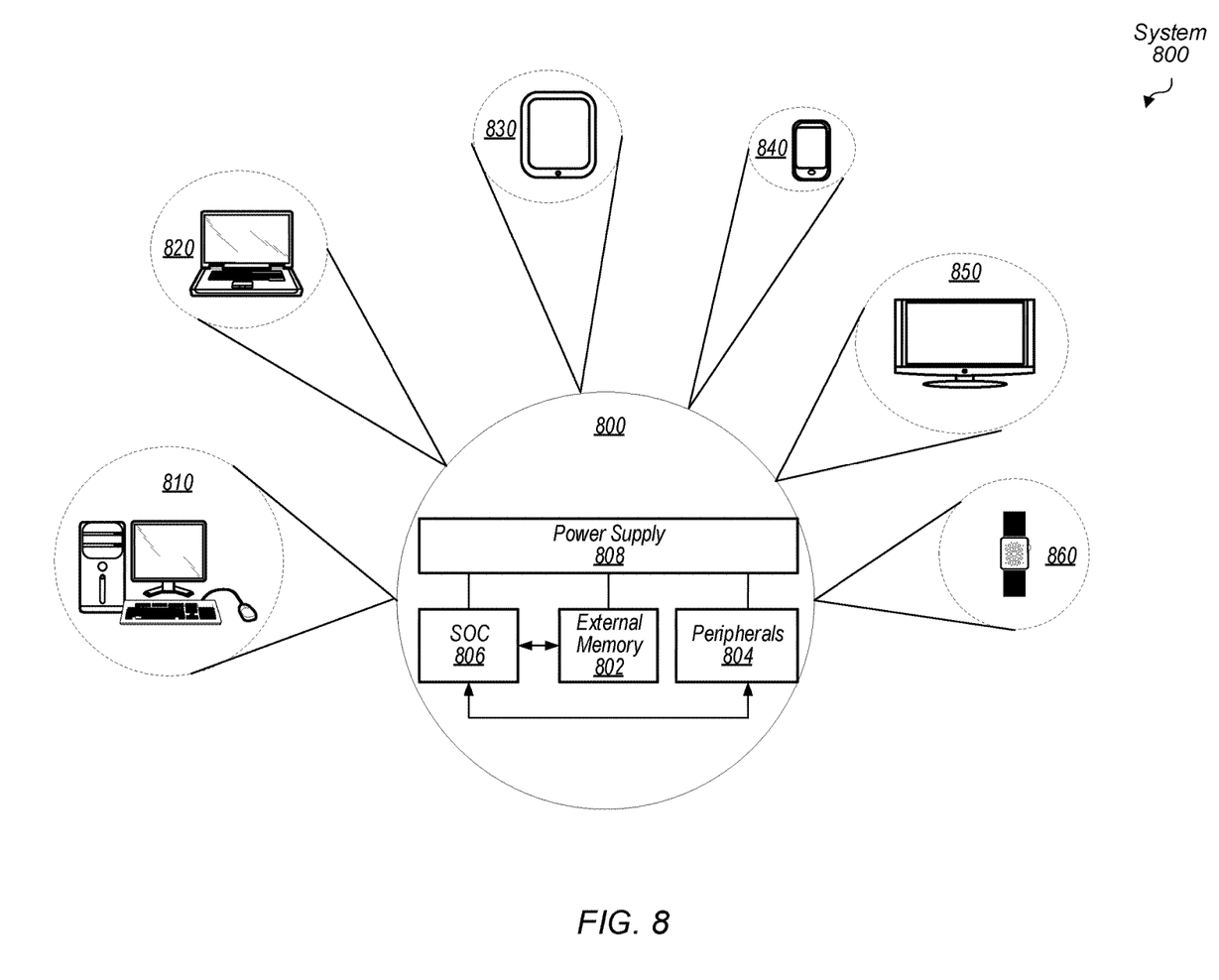
FIG. 8 is a block diagram of one embodiment of a system.

Turning next to FIG. 8, a block diagram of one embodiment of a system 800 is shown. As shown, system 800 represents chip, circuitry, components, etc., of a desktop computer 810, laptop computer 820, tablet computer 830, cell or mobile phone 840, television 850 (or set top box coupled to a television), wrist watch or other wearable item 860, or otherwise. Other devices are possible and are contemplated. In the illustrated embodiment, the system 800 includes at least one instance of a system on chip (SoC) 806 that includes multiple processors and a communication fabric. In some embodiments, SoC 806 includes one or more processor cores similar to processor pipeline core 800 (of FIG. 8), which includes lookup tables (LUTs) such as LUTs 112 and 122 (of FIG. 1), LUTs 400 and 500 (of FIGS. 4-5) and permissions storage 630 (of FIG. 6). In addition, one or more processor complexes within SoC 806 include logic, such as address translation unit (ATU) 116 and ATU 126 (of FIG. 1). In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid-state storage, or disk storage. The peripherals 804 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an address translation unit; and
   a memory;
   wherein in response to receiving a memory access operation comprising a first address, the address translation unit is configured to:
      search a lookup table using a permission index corresponding to the first address to identify a data access permission stored in the lookup table, wherein the permission index is shared by the apparatus and an external processing unit; and
      access data stored in a memory location of the memory identified by a second address in a manner defined by the retrieved data access permission;
   wherein:
      an address mapping between the first address and the second address is shared by the apparatus and an external processing unit; and
      the external processing unit uses a different data access permission than the identified data access permission.

2. The apparatus as recited in claim 1, wherein the address translation unit is configured to determine the permission index and the second address based on the first address.

3. The apparatus as recited in claim 2, wherein the address translation unit is further configured to distinguish among a plurality of types of data access permissions for the same permission index based on an operating mode of the apparatus.

4. The apparatus as recited in claim 2, wherein the address translation unit is further configured to distinguish among a plurality of types of data access permissions for the same permission index using an exception level of the apparatus.

5. The apparatus as recited in claim 1, wherein the data access permission of the apparatus does not comprise execute permission and the data access permission of the external processing unit does comprise execute permission.

6. The apparatus as recited in claim 1, wherein a copy of each of the permission index and the address mapping between the first address and the second address is stored in a shared page table in external memory.

7. A method, comprising:
   receiving, by a processor complex, a memory access operation comprising a first address targeting a memory; and
   in response to receiving the memory access operation:
      searching, by an address translation unit of the processor complex, a lookup table using a permission index corresponding to the first address to identify a data access permission stored in the lookup table; and
      accessing, by the address translation unit, data stored in a memory location of the memory identified by a second address in a manner defined by the retrieved data access permission;
   wherein the permission index and an address mapping between the first address and the second address are shared by the processor complex and an external processing unit, wherein the external processing unit uses a different data access permission than the identified data access permission.

8. The method as recited in claim 7, further comprising the address translation unit determining the permission index and the second address based on the first address.

9. The method as recited in claim 8, further comprising distinguishing among a plurality of data access permissions for the same permission index based on an operating mode of the processor complex.

10. The method as recited in claim 8, further comprising distinguishing among a plurality of data access permissions for the same permission index based on an exception level of the processor complex.

11. The method as recited in claim 7, wherein the data access permission of the processor complex does not comprise an execute permission and the data access permission of the external processing unit does comprise an execute permission.

12. The method as recited in claim 7, wherein a copy of each of the permission index and the address mapping between the first address and the second address is stored in a shared page table in external memory.

13. A non-transitory computer readable storage medium storing program instructions, wherein the program instructions are executable by a processor to:
receive a memory access operation comprising a first address targeting a memory; and
in response to receiving the memory access operation:
search a lookup table using a permission index corresponding to the first address to identify a data access permission stored in the lookup table; and
access data stored in a memory location of the memory identified by a second address in a manner defined by the retrieved data access permission;
wherein the permission index and an address mapping between the first address and the second address are shared by the processor and an external processing unit, wherein the external processing unit uses a different data access permission than the identified data access permission.

14. The non-transitory computer readable storage medium as recited in claim 13, wherein the program instructions are executable by a processor to determine the permission index and the second address based on the first address.

15. The non-transitory computer readable storage medium as recited in claim 14, wherein the program instructions are executable by the processor to distinguish among a plurality of data access permissions for the same permission index based on an operating mode of the processor.

16. The non-transitory computer readable storage medium as recited in claim 14, wherein the program instructions are executable by the processor to distinguish among a plurality of types of data access permissions for the same permission index based on an exception level of the processor.

17. The non-transitory computer readable storage medium as recited in claim 13, wherein a copy of each of the permission index and the address mapping between the first address and the second address is stored in a shared page table in external memory.

* * * * *